(12) United States Patent
Na et al.

(10) Patent No.: US 10,394,063 B2
(45) Date of Patent: Aug. 27, 2019

(54) DISPLAY APPARATUS

(71) Applicant: SAMSUNG ELECTRONICS CO., LTD., Suwon-si (KR)

(72) Inventors: Jeong Shan Na, Hwaseong-si (KR); Yong-Hun Kwon, Anyang-si (KR); Jong Bin Kim, Suwon-si (KR); Hyung Jin Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 475 days.

(21) Appl. No.: 15/095,863

(22) Filed: Apr. 11, 2016

(65) Prior Publication Data

US 2016/0349566 A1     Dec. 1, 2016

(30) Foreign Application Priority Data

May 27, 2015     (KR) ........................ 10-2015-0073719

(51) Int. Cl.
*G02F 1/1333*     (2006.01)
*G02F 1/1335*     (2006.01)

(52) U.S. Cl.
CPC .. *G02F 1/133308* (2013.01); *G02F 1/133385* (2013.01); *G02F 1/133603* (2013.01); *G02F 1/133608* (2013.01); *G02F 2001/133628* (2013.01); *G02F 2201/46* (2013.01); *G02F 2201/465* (2013.01)

(58) Field of Classification Search
CPC ........ G02F 2001/133311; G02F 2001/133314; G02F 2001/133317; G02F 2001/13332; G02F 2001/133322; G02F 2001/133628; G02F 1/133608; G02F 2201/54; G02F 1/133385
See application file for complete search history.

(56) References Cited

U.S. PATENT DOCUMENTS

| | | | |
|---|---|---|---|
| 6,974,221 B2* | 12/2005 | Wu ................... | G02F 1/133604 349/70 |
| 2004/0120161 A1* | 6/2004 | Hwang ............. | G02F 1/133608 362/558 |
| 2005/0219431 A1* | 10/2005 | Chang .............. | G02F 1/133608 349/40 |

(Continued)

FOREIGN PATENT DOCUMENTS

| | | | |
|---|---|---|---|
| JP | WO 2012137765 A1 * | 10/2012 | ............... H04N 5/64 |
| WO | 2013/182733 A1 | 12/2013 | |

OTHER PUBLICATIONS

Machine translation of WO2012137765A1 from Google Patents.*

(Continued)

*Primary Examiner* — Alexander K Garlen
*Assistant Examiner* — Colin J Cattanach
(74) *Attorney, Agent, or Firm* — Sughrue Mion, PLLC

(57) ABSTRACT

A display apparatus, particularly a display apparatus having a supporter member to improve the cooling efficiency, is provided. The display apparatus includes a display panel configured to display an image; a light source configured to emit a light to the display panel; a bottom chassis in which the light source is installed; and a supporter member configured to support the display panel, wherein the supporter member includes a cooling flow path configured to allow an air to flow to the inside of the supporter member.

20 Claims, 17 Drawing Sheets

(56) References Cited

U.S. PATENT DOCUMENTS

| | | | |
|---|---|---|---|
| 2006/0034090 A1* | 2/2006 | Chen | G02F 1/133604 |
| | | | 362/390 |
| 2008/0111949 A1* | 5/2008 | Shibata | G02F 1/133603 |
| | | | 349/64 |
| 2010/0073596 A1 | 3/2010 | Jeong et al. | |
| 2010/0328966 A1* | 12/2010 | Shin | G02F 1/133605 |
| | | | 362/609 |
| 2011/0075417 A1* | 3/2011 | Lai | F21V 29/004 |
| | | | 362/235 |
| 2012/0048511 A1* | 3/2012 | Moshtagh | F21V 29/83 |
| | | | 165/80.2 |
| 2012/0182496 A1* | 7/2012 | Nozawa | G02F 1/133603 |
| | | | 349/61 |
| 2013/0222754 A1 | 8/2013 | Kohtoku | |
| 2013/0301241 A1* | 11/2013 | Maeda | F21V 29/00 |
| | | | 362/97.1 |
| 2013/0303264 A1 | 11/2013 | Gill et al. | |
| 2013/0335675 A1* | 12/2013 | Hu | G02F 1/133504 |
| | | | 349/64 |
| 2014/0016063 A1 | 1/2014 | Lin et al. | |
| 2014/0016314 A1* | 1/2014 | Woodgate | F21K 9/00 |
| | | | 362/235 |
| 2014/0184980 A1* | 7/2014 | Onoue | G02F 1/1336 |
| | | | 349/58 |

OTHER PUBLICATIONS

Communication dated Mar. 28, 2017, issued by the European Patent Office in counterpart European Application No. 16163010.8.
Communication dated Jun. 24, 2016, from the European Patent Office in counterpart European Application No. 16163010.8.

* cited by examiner

DISPLAY APPARATUS

CROSS-REFERENCE TO RELATED APPLICATION

This application claims priority from Korean Patent Application No. 10-2015-0073719, filed on May 27, 2015 in the Korean Intellectual Property Office, the disclosure of which is incorporated herein by reference in its entirety.

BACKGROUND

1. Field

Apparatuses consistent with exemplary embodiments relate to a display apparatus, particularly a display apparatus having a supporter member to improve the cooling efficiency.

2. Description of the Related Art

Generally, a display apparatus, e.g. a television (TV) or a monitor is configured to display an image.

The display apparatus may be classified into a variety of apparatuses based on the method for displaying image information, which is signal processed, on a screen. Recently, a Liquid Crystal Display (LCD) type and a Plasma Display Panel (PDP) type are the main types of display apparatuses used.

However, since a liquid crystal display panel is a photo-detector that does not emit light by itself, the LCD includes a backlight unit configured to supply additional light source.

The backlight unit may include a light source emitting a light, optical members provided to improve the efficiency of the light, and a bottom chassis in which the light source and the optical members are placed.

Meanwhile, hot-light generated in the light source may cause an increase of the internal temperature of the backlight assembly, and thus the degradation of the backlight assembly may be accelerated by the increased internal temperature.

SUMMARY

It is an aspect of the present disclosure to provide to a display apparatus capable of improving the cooling efficiency of a backlight unit.

It is another aspect of the present disclosure to provide to a display apparatus capable of effectively reducing a radiant heat and a conductive heat generated by a light source of a backlight unit.

It is another aspect of the present disclosure to provide to a display apparatus capable of improving the durability through temperature diffusion and a temperature reduction inside of a backlight unit by the expansion of the optical technology.

Additional aspects of the present disclosure will be set forth in part in the description which follows and, in part, will be obvious from the description, or may be learned by practice of the disclosure.

In accordance with one aspect of the present disclosure, a display apparatus includes a display panel configured to display an image; a light source configured to emit a light to the display panel; a bottom chassis in which the light source is installed; and a supporter member configured to support the display panel, wherein the supporter member may include a cooling flow path configured to allow air to flow. The air may flow inside of the supporter member.

The supporter member may include an optical supporter configured to support a rear side of the display panel; and a supporter supporting unit provided in one end portion of the optical supporter, wherein the cooling flow path may include a first cooling flow path formed in an inside of the optical supporter and a second cooling flow path formed in the supporter supporting unit.

The bottom chassis may include a hole in which the supporter supporting unit is installed.

The cooling flow path may be connected to an area outside of the bottom chassis via the hole.

The supporter member may include at least one metal material.

The optical supporter may further include a guide.

The guide may be formed in an inner surface of the optical supporter.

The guide may be formed in an outer surface of the optical supporter.

The guide may have a spiral shape.

The guide may include a rib.

The rib may have a shape having a width that gets smaller in a direction toward the display panel.

The optical supporter may have a shape having a width that gets smaller in a direction toward the display panel.

The display apparatus may further include at least one circulation cooling flow path configured to allow an air to flow to the cooling flow path, and a blowing fan configured to circulate the air of the circulation cooling flow path.

The circulation cooling flow path may include a guide unit configured to guide an air current.

In accordance with another aspect of the present disclosure, a display apparatus includes a display panel; a light source configured to emit a light to the display panel; a bottom chassis configured to support the light source; and a supporter member provided between the display panel and the bottom chassis, wherein the supporter member may include an optical supporter configured to support a rear side of the display panel; a supporter supporting unit configured to connect the optical supporter to the bottom chassis; and a cooling flow path configured to cool a space between the display panel and the bottom chassis.

The bottom chassis may include an installation hole via which the supporter supporting unit is connected, and the supporter supporting unit may include an air inlet configured to introduce air to the cooling flow path corresponding to the installation hole.

The optical supporter may include at least one metal material.

The supporter supporting unit may include at least one from among a plastic, an acrylic, and a resin material.

The optical supporter may include a guide.

The guide may be formed in at least one from among an inner surface and an outer surface of the optical supporter.

The guide may include at least one from among a rib and a groove.

The guide may include at least one from among a linear shape and a spiral shape.

The optical supporter may have a shape having a width thereof being reduced toward the display panel.

In accordance with another aspect of the present disclosure, a display apparatus includes a display panel; and a plurality of supporting members configured to support the display panel, wherein at least one of the plurality of supporting members may include a hollow space in the inside thereof.

At least one portion of the at least one of the plurality of supporting members may include a metal material.

The display apparatus may further include a light source configured to emit a light to the display panel and a bottom chassis configured to support the light source, wherein the at least one of the plurality of supporting members is installed in the bottom chassis.

BRIEF DESCRIPTION OF THE DRAWINGS

These and/or other aspects of the invention will become apparent and more readily appreciated from the following description of the exemplary embodiments, taken in conjunction with the accompanying drawings of which.

DETAILED DESCRIPTION

Hereinafter exemplary embodiments of the present disclosure will be described with reference to drawings. In the following detailed description, the terms of "front end", "rear end", "upper portion", "lower portion", "upper end", "lower end" and the like may be defined by the drawings, but the shape and the location of the component is not limited by the term.

Figure 1:
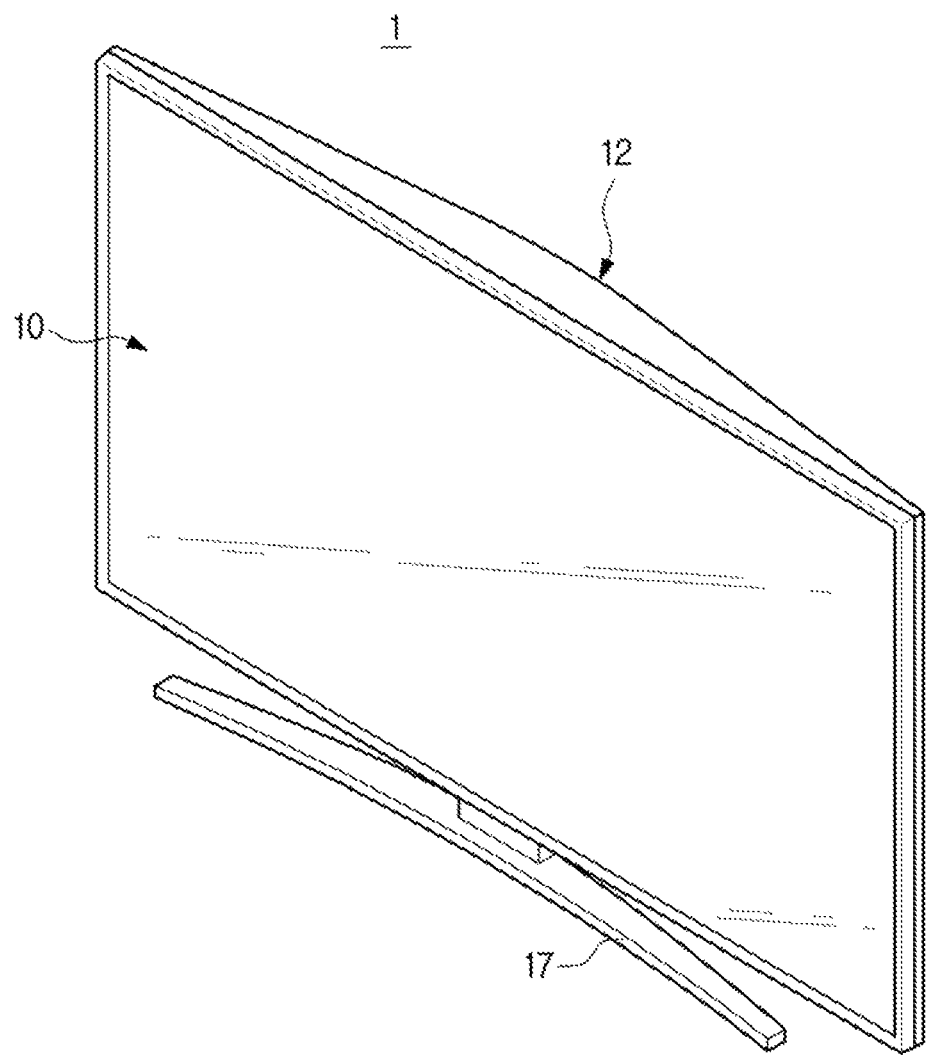
FIG. 1 is a perspective view of a display apparatus in accordance with an exemplary embodiment of the present disclosure.
Figure 2:
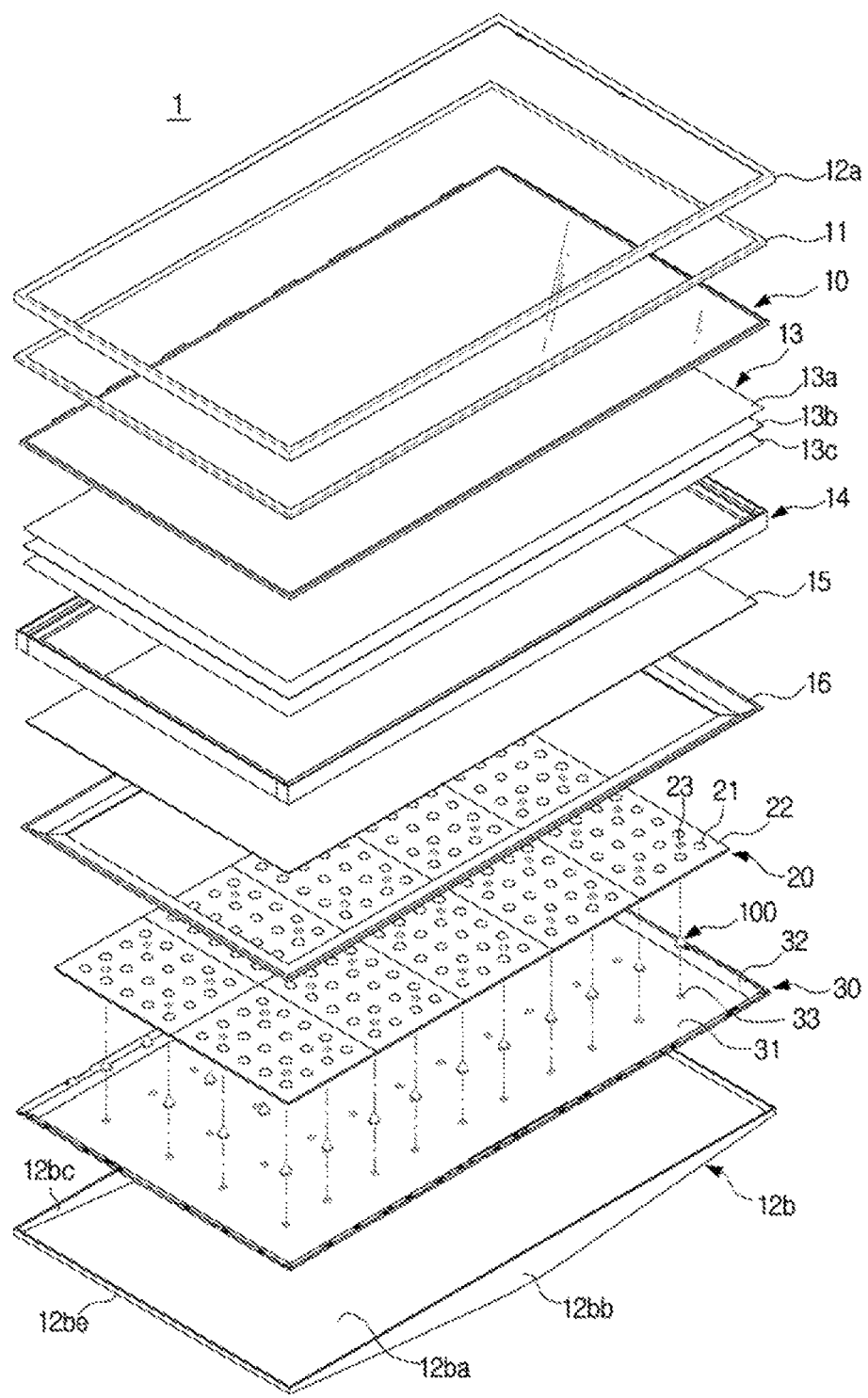
FIG. 2 is an exploded view of a display apparatus in accordance with an exemplary embodiment of the present disclosure.

As illustrated in FIGS. 1 and 2, a display apparatus 1 includes a display panel 10 configured to display image information to a user, and a case 12 disposed on the outside of the display panel 10 to accommodate the display panel 10 and a variety of internal components. In the inside of the case 12, a backlight unit (BLU) 20 is provided.

The display panel 10 may be implemented by a liquid crystal display (LDC) panel, and generally, the LDC panel may be formed in a way that a liquid crystal layer is injected between two glasses which are a Thin Film Transistor (TFT) and a color substrate, and the light emission state of each pixel may be individually implemented by a driving circuit arranged in a matrix type, thereby forming an overall image.

The case 12 may include a front case 12a disposed on a front side to form a front surface of the display apparatus 1 and a rear case 12b disposed on a rear side to form a rear surface of the display apparatus 1.

The rear case 12b is formed to surround an edge and the rear surface of the display panel 10 from the rear side of the display panel 10.

The rear case 12b may be formed in a hexahedral shape having an open front surface, and may include a rear surface 12ba formed to be spaced apart from an opening, an upper surface 12bb connected to an upper end portion of the rear surface 12ba, a lower surface 12bc connected to a lower end portion of the rear surface 12ba, and a side surface 12be connected to the right and left side end portion of the rear surface 12ba, respectively.

A base 17 supported by an installation plane (not shown), e.g. a ground, for installing the display apparatus 1 may be provided in a lower side of the case 12. The case 12 and the base 17 may be connected to each other by a stand (not shown).

Meanwhile, in an exemplary embodiment of the present disclosure, a case where the display apparatus 1 is installed in a supporting plane by the base 17 is described as an example, but is not limited thereto. For example, the display apparatus 1 may be fixed to a wall through a wall mounting bracket that is installed in the wall. The walling mounting bracket may be detachably installed to the case 12 or may be fixed to the wall through the case 12.

A top chassis 11 is provided in the front side of the display panel 10, and a bottom chassis 30 is provided in the rear side of the display panel 10. A mid-mold 14 provided between the top chassis 11 and the backlight unit 20 may be further provided.

The top chassis 11 is formed in the form of a square ring. The top chassis 11 is provided in the same surface as the display panel 10 in which an image is displayed, so that an edge portion of the display panel 10 is prevented from being exposed.

The bottom chassis 30 may be disposed on a surface opposite to the display panel 10, and may prevent a variety of components included in the display apparatus 1 from being exposed. In addition, the bottom chassis 30 may protect a variety of components included in the display apparatus 1 from an external impact.

The mid mold 14 is configured to support the display panel 10 and the backlight unit 20. The mid mold 14 is formed in the form of a square ring, and is formed in a way that the display panel 10 is supported by a front surface thereof and the backlight unit 20 is supported by a rear surface thereof.

The backlight unit 20 is disposed in a rear side of the display panel 10.

A diffusion member 15 configured to diffuse a light emitted from the backlight unit 20 and a plurality of optical sheets 13 configured to improve an optical characteristics of the light passed through the diffusion member 15 are provided.

The optical sheet 13 may include a diffusion sheet 13c diffusing the light passed through the diffusion member 15 again, a prism sheet 13b provided with a prism pattern to focus the light, which is diffused by the diffusion sheet 13c, in a perpendicular direction to the display panel 10 disposed in the front side, and a protection sheet 13a disposed on a front side of the prism sheet 13b to protect the prism sheet 13b that is vulnerable to a dust and a scratch.

The backlight unit 20 may include a printed circuit board (PCB) 22 formed in the form of flat plate, and a plurality of light emitting diodes (LED) 21 mounted to the PCB 22.

The PCB 22 may be formed in the form of a square plate, and a plurality of light source substrates to which the LEDs 21 are mounted may be disposed in parallel with each other to form row and column. The plurality of light source substrates may be provided to correspond to the display panel 10.

The PCB 22 may be accommodated in the bottom chassis 30.

The bottom chassis 30 is formed in a hexahedral shape having an open front surface to accommodate the display panel 10 in the inside thereof. The bottom chassis 30 may include a bottom rear surface unit 31 formed in a square plate shape to form a rear surface of the bottom chassis 30 to support the PCB 22, and a bottom side unit 32 coupled to the mid mold 14 by forming an edge of the bottom rear surface unit 31.

A hold frame 16 may be provided in an outer edge of the bottom chassis 30 to support the diffusion member 15.

The hold frame 16 may be formed in a square ring shape to support the outer edge of the diffusion member 15.

Meanwhile, the bottom chassis 30 may include a supporter member 100 configured to support between the display panel 10 and the bottom chassis 30. The supporter member 100 is disposed on a rear side of the display panel 10 to maintain a distance between the display panel 10 and the bottom chassis 30.

Several supporter members 100 may be formed in the rear side of the display panel 10. The supporter member 100 may be installed in the bottom chassis 30. The respective supporter members 100 may be disposed to be spaced apart from each other in four directions of up, down, left and right of the bottom chassis 30. The supporter members 100 may be disposed between the plurality of LEDs 21 of the backlight unit 20.

In the bottom rear surface unit 31 of the bottom chassis 30, a plurality of installation holes 33 may be provided to allow the supporter member 100 to be installed.

In addition, in the PCB 22 of the backlight unit 20, a through hole 23 is formed to allow the supporter member 100 to be passed therethrough. Several through holes 23 may be provided. The through holes 23 may be formed in a position corresponding to the installation holes 33 of the bottom chassis 30.

Figure 3:
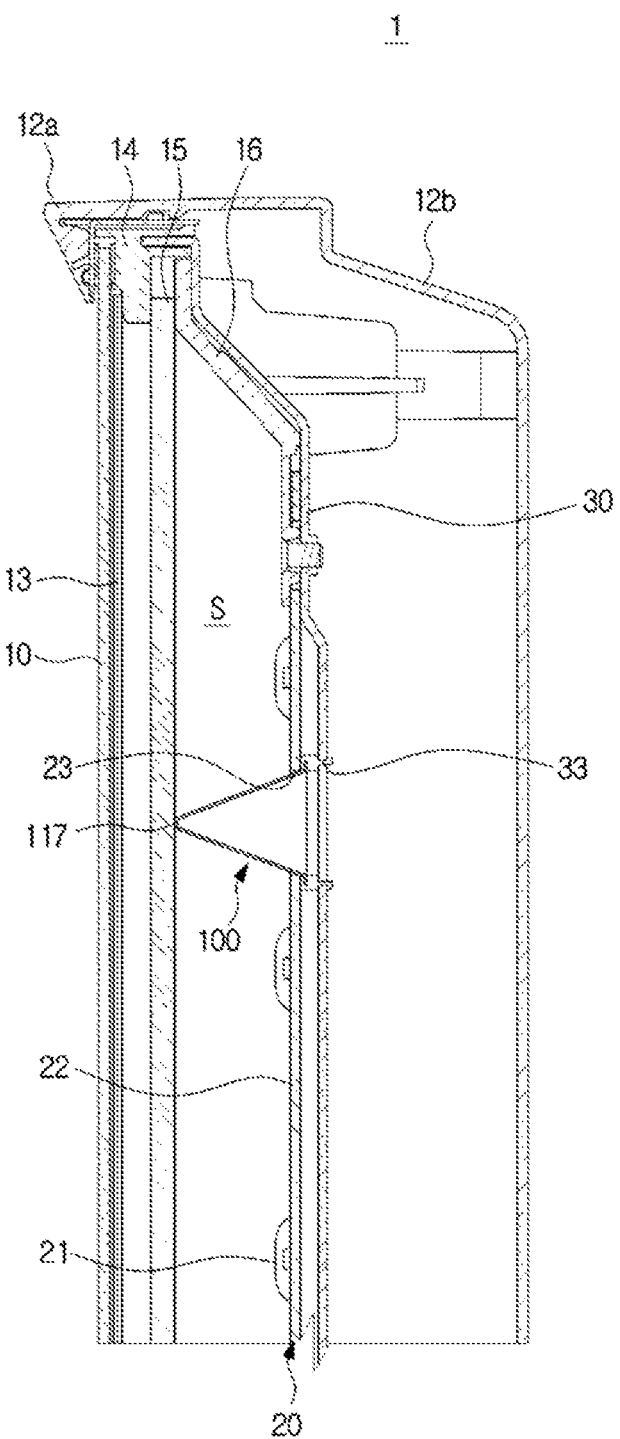
FIG. 3 is a cross-sectional view of a display apparatus in which a supporter member is installed in accordance with an exemplary embodiment of the present disclosure.
Figure 4:
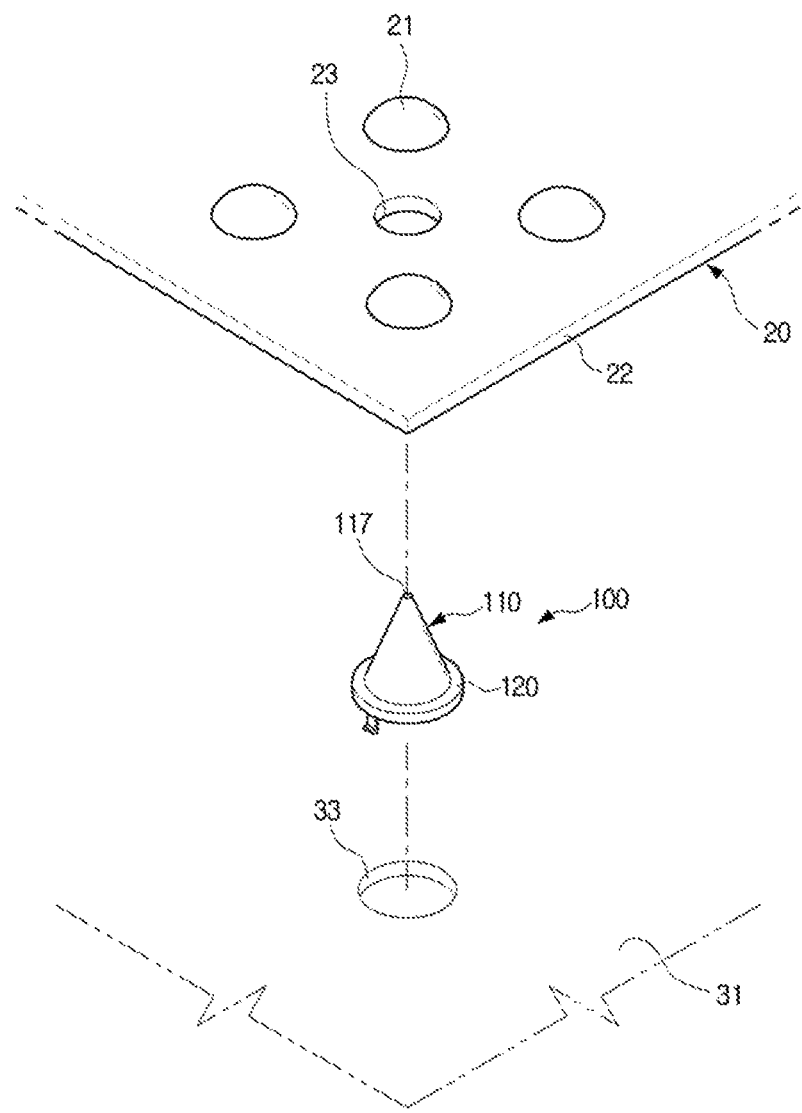
FIG. 4 is a view of a motion in which a supporter member is mounted to a bottom chassis in accordance with an exemplary embodiment of the present disclosure.
Figure 5:
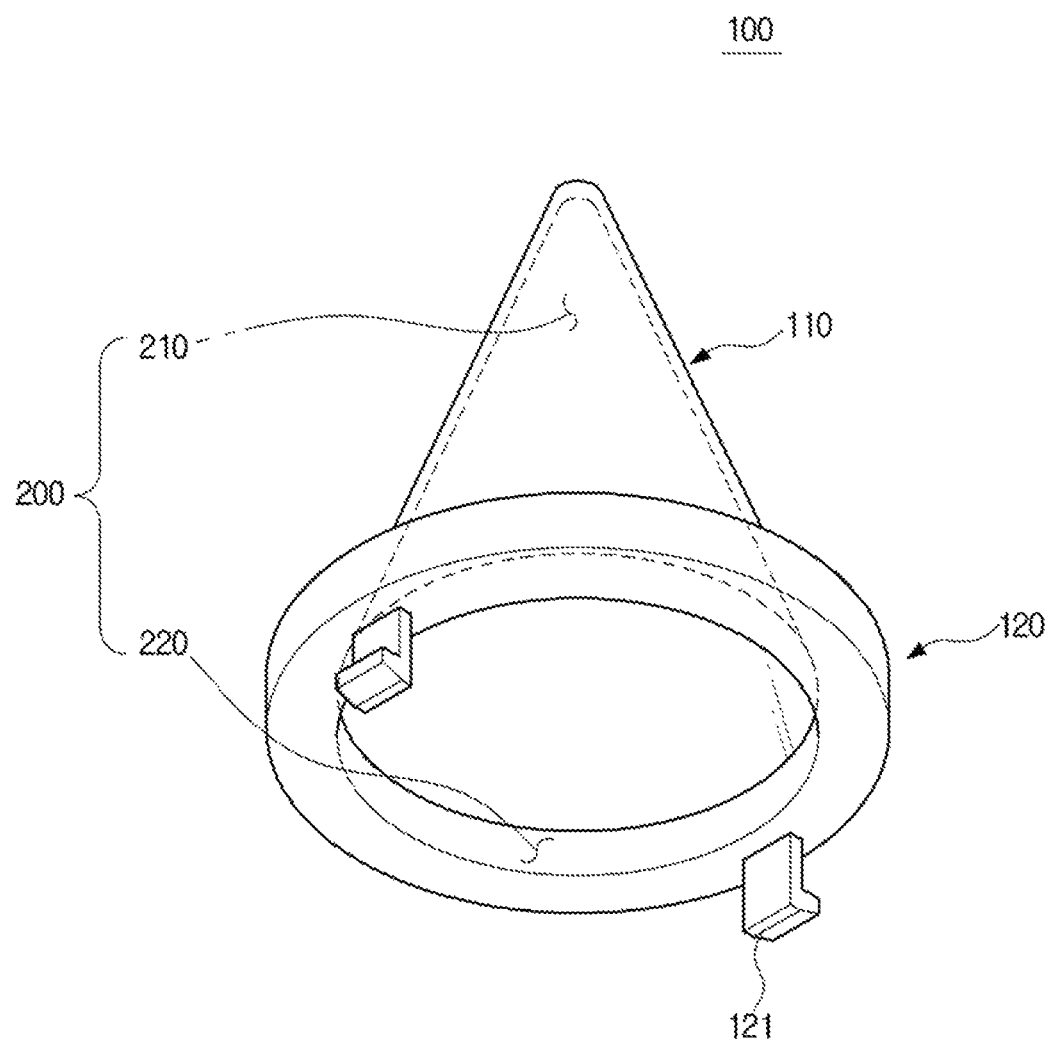
FIG. 5 is a perspective view of a supporter member in accordance with an exemplary embodiment of the present disclosure.

FIG. 3 is a cross-sectional view of a display apparatus in which a supporter member is installed in accordance with an exemplary embodiment of the present disclosure, FIG. 4 is a view of a motion in which a supporter member is mounted to a bottom chassis in accordance with an exemplary embodiment of the present disclosure, and FIG. 5 is a perspective view of a supporter member in accordance with an exemplary embodiment of the present disclosure.

As illustrated in FIGS. 3 to 5, in accordance with an exemplary embodiment of the present disclosure, the supporter member 100 includes an optical supporter 110 configured to support a rear surface of the display panel 10 and a supporter supporting unit 120 provided in one end of the optical supporter 110.

The supporter member 100 is formed to be hollow so that an air flows to the inside thereof. A cooling flow path 200 may be formed in the inside of the supporter member 100.

The cooling flow path 200 includes a first cooling flow path 210 and a second cooling flow path 220.

The first cooling flow path 210 is formed in the inside of the optical supporter 110 of the supporter member 100, and the second cooling flow path 220 is formed in the inside of the supporter supporting unit 120. The first cooling flow path 210 is connected to the second cooling flow path 220.

The optical supporter 110 may be formed in the form of a cone. The optical supporter 110 may be formed to have a shape having a reduced width in areas that are closer to the display panel 10. In an exemplary embodiment of the present disclosure, the supporter member 100 is illustrated to have a cone shape, but the shape of the supporter member 100 is not limited thereto. For example, a support member 100 may have a variety of shapes as long as it is hollow and mounted to a bottom chassis to support a rear surface of a display panel.

In an upper end of the optical supporter 110, a supporting plane 117 having a flat shape may be further provided to support the display panel 10 by making contact to the rear surface of the display panel 10.

The supporter supporting unit 120, which is provided in the lower end of the optical supporter 110, may be formed in the form of a ring. The supporter supporting unit 120 may have a shape having the center thereof penetrated to form the second cooling flow path 220, and the second cooling flow path 220 may be communicated with the first cooling flow path 210 of the optical supporter 110.

Meanwhile, a coupling unit 121 may be formed in a lower portion of the supporter supporting unit 120. The coupling unit 121 may be formed in the form of hook having the elasticity so as to be coupled to the installation holes 33 of the bottom chassis 30.

A case where two coupling units 121 are symmetrically formed on the supporter supporting unit 120 having the ring shape is illustrated as an example, but the number of the coupling unit 121 of the supporter supporting unit 120 may vary. In accordance with an exemplary embodiment of the present disclosure, a case where the coupling unit 121 having the hook shape is elastically supported from the inside to the outside of the installation holes 33 of the bottom chassis 30 is described as an example, but is not limited thereto.

The installation holes 33 of the bottom chassis 30 may be formed to correspond to the second cooling flow path 220 of the supporter supporting unit 120. The installation holes 33 may have a size corresponding to the coupling unit 121 of the supporter supporting unit 120. In an exemplary embodiment of the present disclosure, a case where the installation hole of the bottom chassis is formed to have a size to correspond to the coupling unit of the supporter supporting unit is described as an example, but is not limited thereto. For example, the installation hole may be formed to be separated from the coupling unit of the supporter supporting unit. The installation hole of the bottom chassis may be formed in a position corresponding to the second cooling flow path of the supporter supporting unit.

The supporter member 100 may be installed in the bottom chassis 30 in a way that the coupling unit 121 of the supporter supporting unit 120 is coupled to the installation holes 33 of the bottom chassis 30. The supporter member 100 installed in the bottom chassis 30 may be fixed in a way that the optical supporter 110 is passed through the through hole 23 of the PCB 22.

The supporting plane 117 provided in the upper end of the optical supporter 110 may support the display panel 10 by making contact with the rear surface of the diffusion member 15 disposed in the rear side of the display panel 10.

The supporter member 100 is configured to cool a space (S) between the bottom chassis 30 and the display panel 10. The optical supporter 110 of the supporter member 100 may include at least one metal material. The optical supporter 110 may include a metal having high thermal conductivity.

In an exemplary embodiment of the present disclosure, a case where the optical supporter 110 of the supporter member 100 is formed of metal material is described as an example, but is not limited thereto. For example, the optical supporter may be formed in a way of being coated with a metal material having high thermal conductivity.

Meanwhile, the optical supporter 110 formed of a metal material may include a coupling protrusion 113 protruding from an end portion of the optical supporter 110. A coupling groove 123 having a shape corresponding to the coupling protrusion 113 may be formed in the supporter supporting unit 120. The coupling groove 123 of the supporter supporting unit 120 may be formed at an upper inner circumferential surface having a ring shape. The coupling protrusion 113 of the optical supporter 110 may be coupled to the coupling groove 123 of the supporter supporting unit 120.

Figure 6:
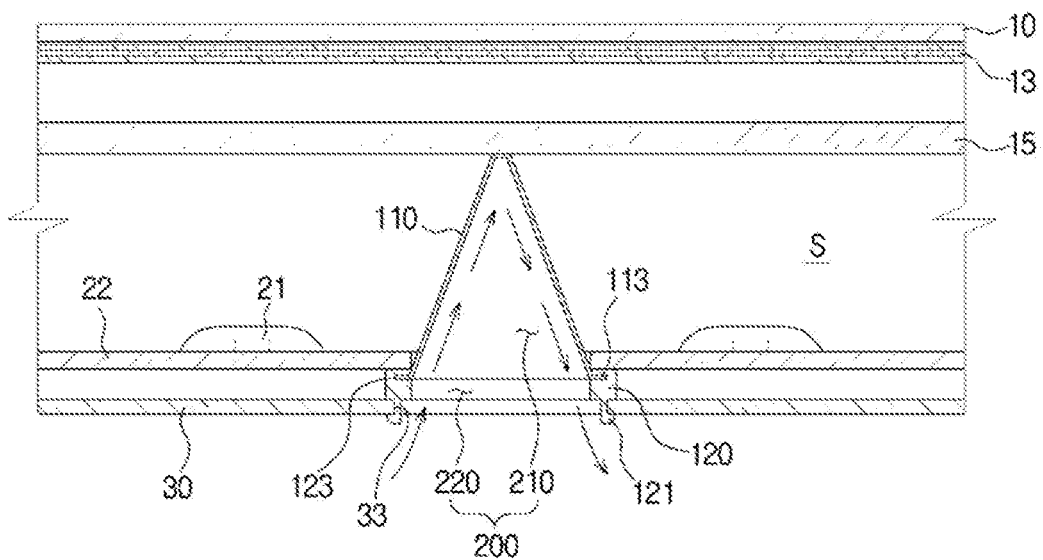
FIG. 6 is a view of a cooling flow path of a supporter member in accordance with an exemplary embodiment of the present disclosure.

As illustrated in FIG. 6, a temperature of the space (S) between the display panel 10 and the bottom chassis 30 may be increased by the plurality of LEDs 21 and the PCB 22 of the backlight unit 20 provided in the rear side of the display panel 10.

The supporter member 100 mounted to the bottom chassis 30 may allow the cooling efficiency to be improved by decreasing a surface temperature of the optical supporter 110 disposed between the diffusion member 15 in the rear side of the display panel 10, and the bottom chassis 30.

In the inside of the optical supporter 110, the cooling flow path 200 that is hollow is formed. In the optical supporter 110, the first cooling flow path 210 is formed, and in the supporter supporting unit 120, the second cooling flow path 220 connected to the first cooling flow path 210 is formed.

An external air, which flows through the installation holes 33 of the bottom chassis 30, flows to the first cooling flow path 210 of the optical supporter 110 via the second cooling flow path 220 of the supporter supporting unit 120.

The external air may include an external air of the bottom chassis 30 and an internal air of the rear case 12b.

Therefore, an external air that is circulated via the cooling flow path 200 of the supporter member 100 may decrease the surface temperature of the optical supporter 110 formed of a metal material, and thus the decrease of the surface temperature of the optical supporter 110 may allow the temperature of the space (S) between the display panel 10 and the bottom chassis 30 to be decreased.

Figure 7:
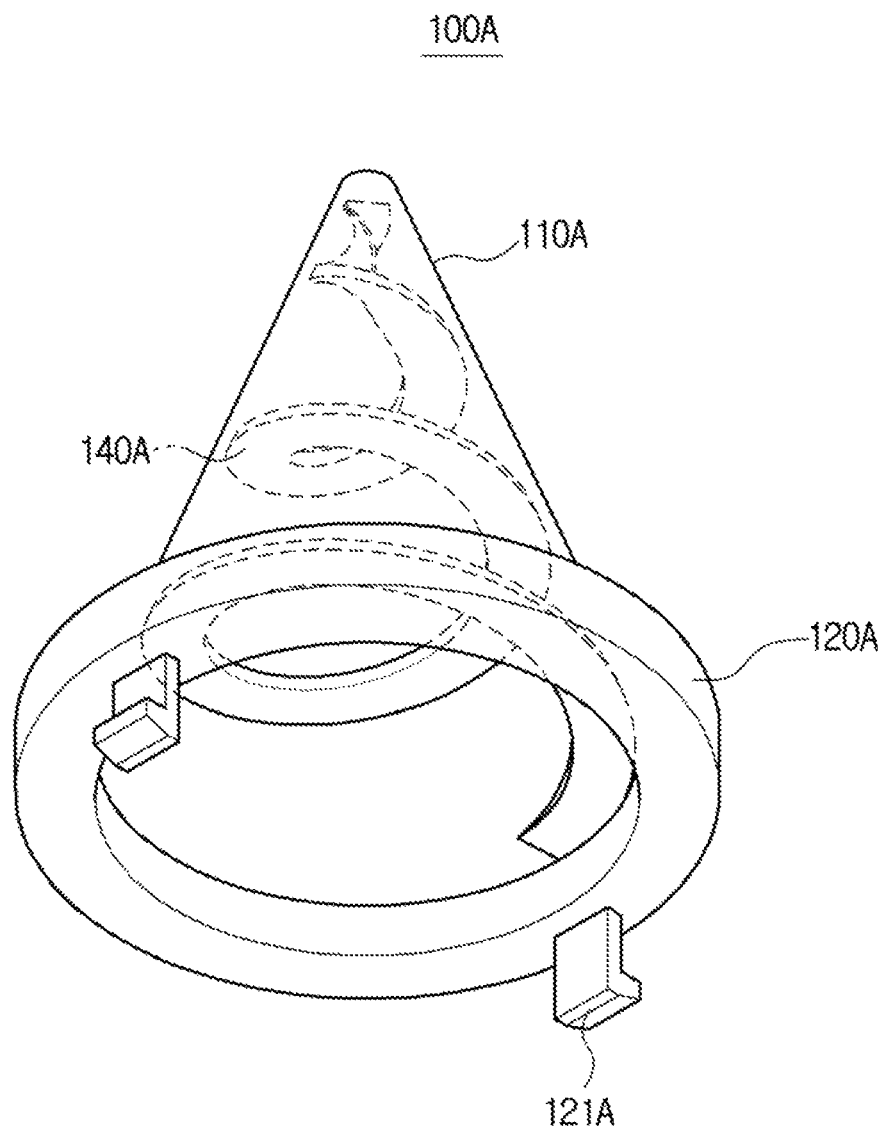
FIG. 7 is a perspective view of a supporter member in accordance with another exemplary embodiment of the present disclosure.
Figure 8:
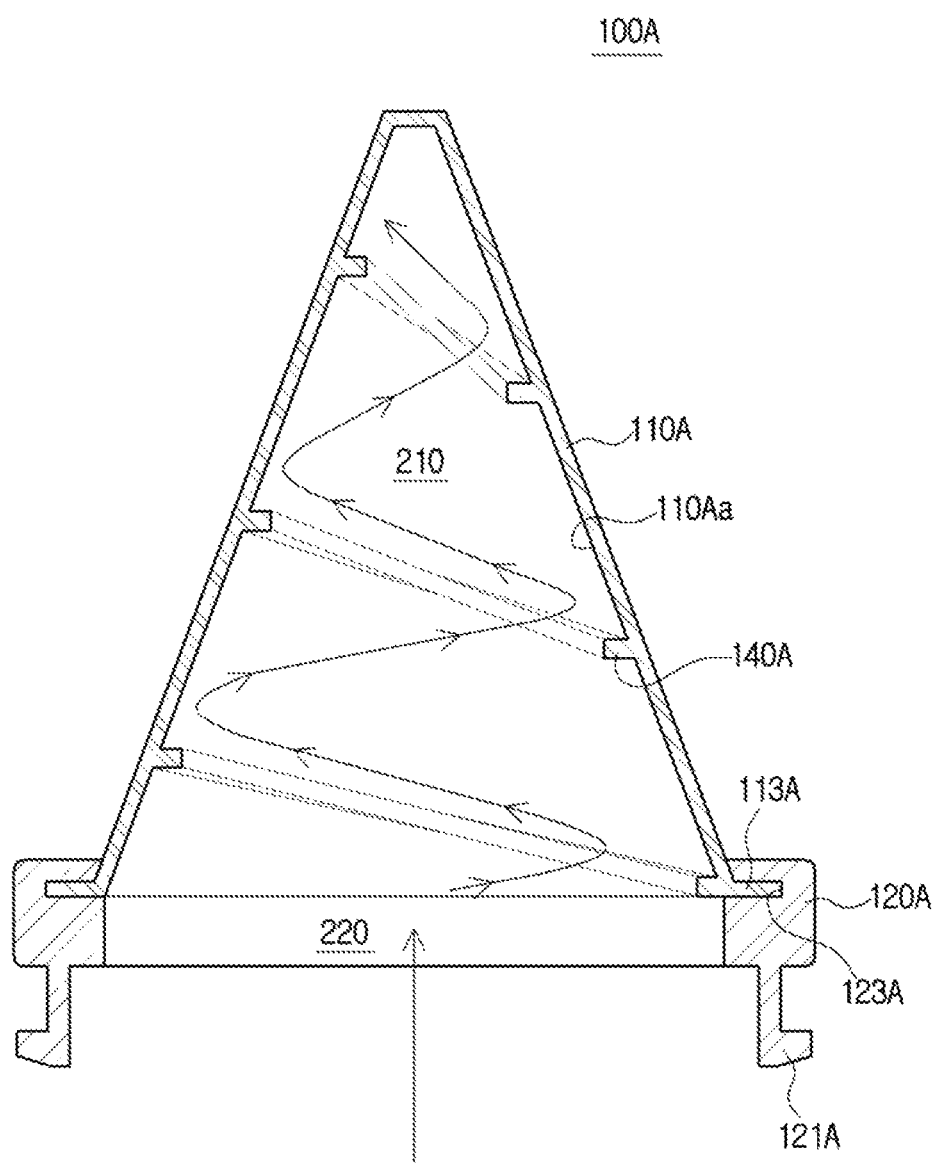
FIG. 8 is a view of a cooling flow path of a supporter member in accordance with another exemplary embodiment of the present disclosure.

FIG. 7 is a perspective view of a supporter member in accordance with another exemplary embodiment of the present disclosure and FIG. 8 is a view of a cooling flow path of a supporter member in accordance with another exemplary embodiment of the present disclosure. Hereinafter drawing symbols that are not shown may refer to FIGS. 1 to 6. In addition, a description of the same parts as those shown in FIGS. 1 to 6 will be omitted.

As illustrated in FIGS. 7 and 8, a supporter member 100A may further include a guide 140A.

The guide 140A is configured to guide an air movement of a cooling flow path 200 inside of the supporter member 100A. The guide 140A may be formed in an inner surface 110Aa of the supporter member 100A. The guide 140A may be formed to be protruded on the inner surface 110Aa of an optical supporter 110A of the supporter member 100A. The guide 140A may include a spiral shape. The guide 140A may be formed to be winding from a wide width to a narrow width of the optical supporter 110A.

Therefore, an external air having a low temperature introduced from the outside of the bottom chassis 30 may be introduced to the cooling flow path 200 inside of the supporter member 100A, and the introduced air may circulate the cooling flow path 200 by making contact with the guide 140A having the spiral shape, thereby decreasing the temperature of the optical supporter 110A.

A temperature of the space (S) between the display panel 10 and the bottom chassis 30 that is increased by the backlight unit 20 may be lowered by the decreased surface temperature of the optical supporter 110A so that a temperature of the internal space (S) of the optical space may be reduced.

Figure 9:
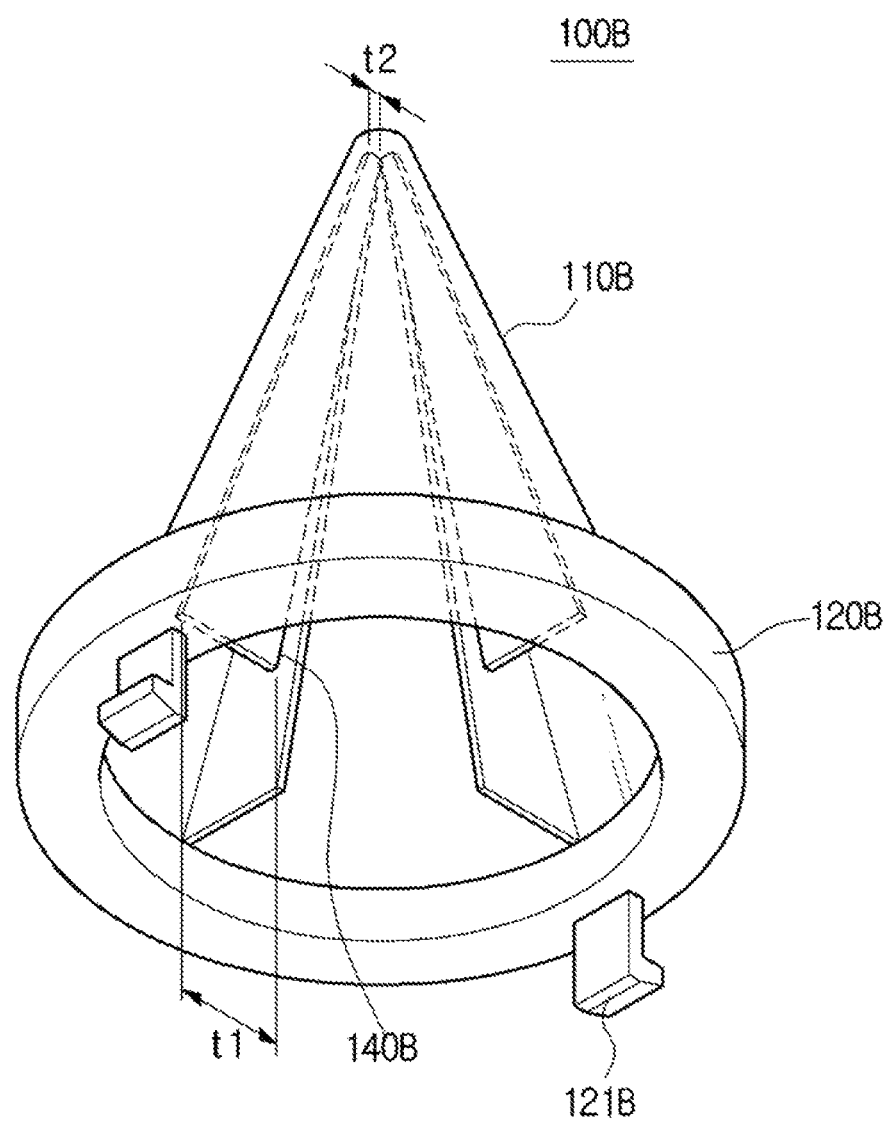
FIG. 9 is a perspective view of a supporter member in accordance with another exemplary embodiment of the present disclosure.
Figure 10:
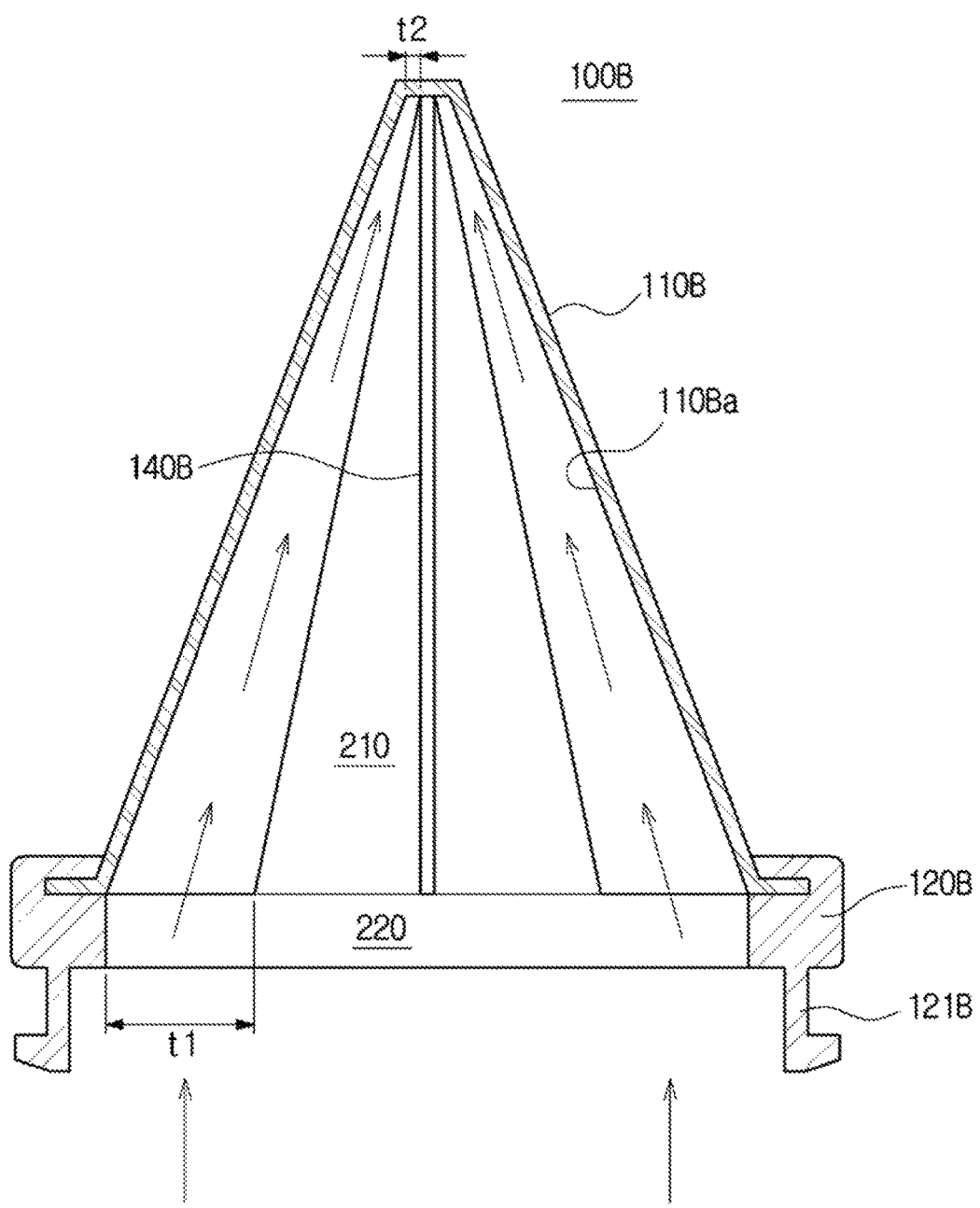
FIG. 10 is a view of a cooling flow path of a supporter member in accordance with another exemplary embodiment of the present disclosure.

FIG. 9 is a perspective view of a supporter member in accordance with another exemplary embodiment of the present disclosure and FIG. 10 is a view of a cooling flow path of a supporter member in accordance with another embodiment of the present disclosure.

As illustrated in FIGS. 9 and 10, a supporter member 100B may further include a guide 140B.

The guide 140B is configured to guide an air movement of a cooling flow path 200 inside of the supporter member 100B. The guide 140B may be formed to be protruded on an inner surface 110Ba of the supporter member 100B The guide 140B may include a rib 141B that protrudes and has a plate shape. The rib 141B having the plate shape may have a shape having a width thereof being reduced toward the display panel 10. That is, the rib 141B having the plate shape may be formed to have a first width (t1) on the side closest to a supporter supporting unit 120B, and a second width (t2) on the side closest to the display panel 10. The first width (t1) may be larger than the second width (t2).

Therefore, an external air having a low temperature introduced from the outside of the bottom chassis 30 may be introduced to the cooling flow path 200 inside of the supporter member 100B, and the introduced air may circulate the cooling flow path 200 by making contact with the rib 141B having the plate shape, thereby decreasing the temperature of an optical supporter 110B.

A temperature of the space (S) between the display panel 10 and the bottom chassis 30 that is increased by the backlight unit 20 may be lowered by the decreased surface temperature of the optical supporter 110B so that a temperature of the internal space (S) of the optical space may be reduced.

Figure 11:
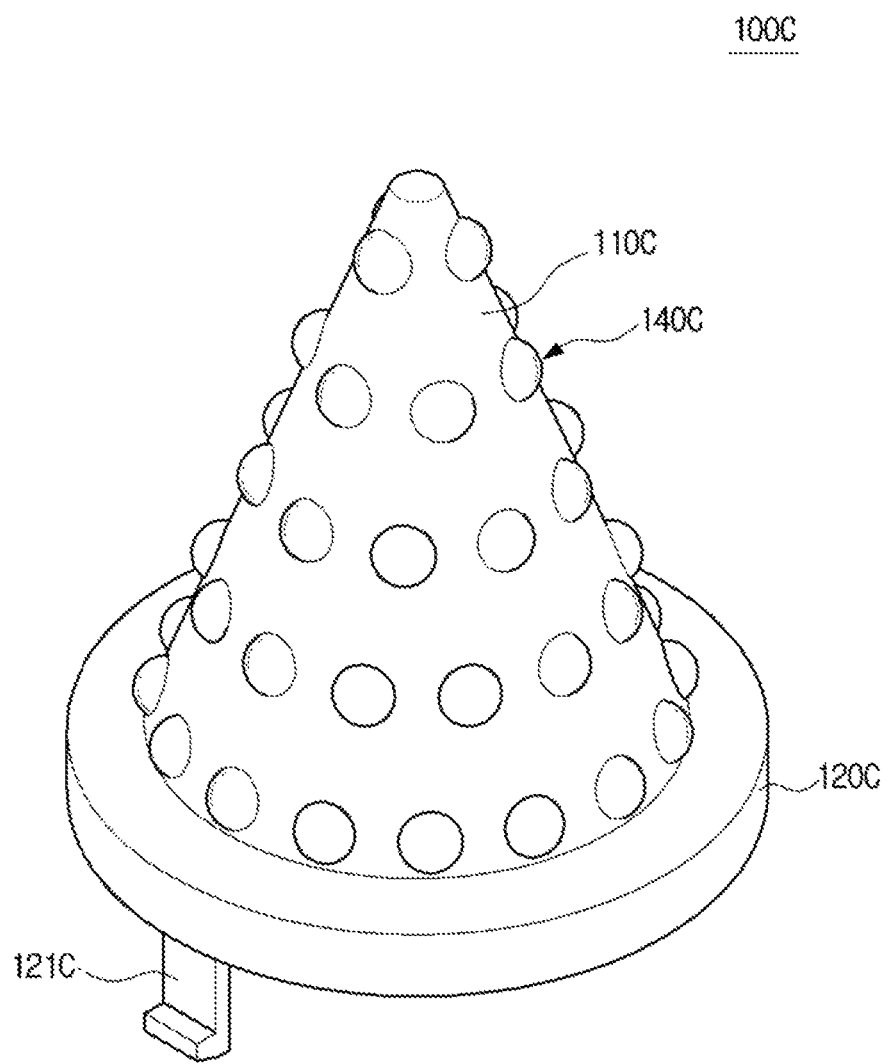
FIG. 11 is a perspective view of a supporter member in accordance with another exemplary embodiment of the present disclosure.
Figure 12:
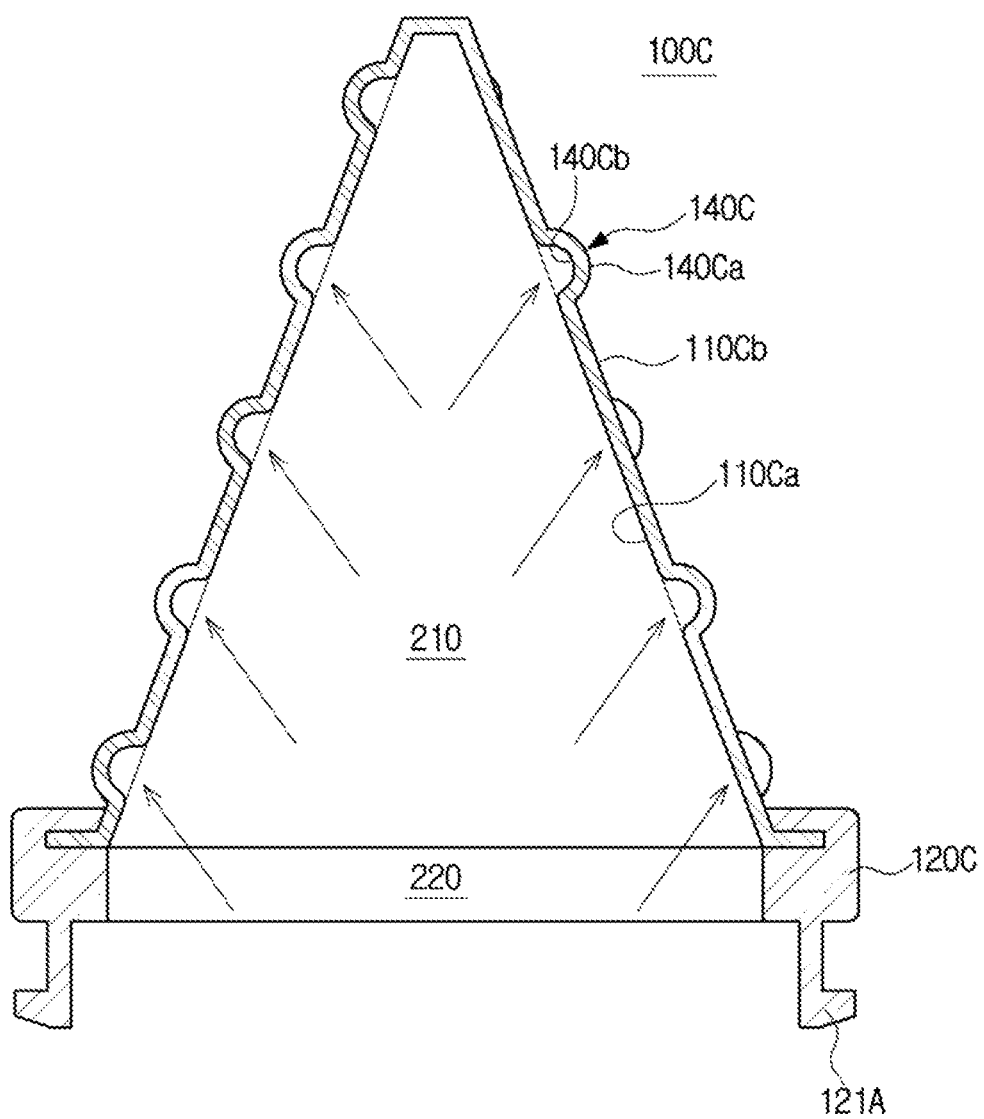
FIG. 12 is a view of a cooling flow path of a supporter member in accordance with another exemplary embodiment of the present disclosure.

FIG. 11 is a perspective view of a supporter member in accordance with another exemplary embodiment of the present disclosure and FIG. 12 is a view of a cooling flow path of a supporter member in accordance with another exemplary embodiment of the present disclosure.

As illustrated in FIGS. 11 and 12, a supporter member 100C may further include a guide 140C.

The guide 140C may be configured to guide an air movement of a cooling flow path 200 inside of the supporter member 100C. The guide 140C may be formed in an inner surface 110Ca and an outer surface 110Cb of the supporter member 100C. The guide 140C may be formed in the inner surface 110Ca and the outer surface 110Cb of an optical supporter 110C of the supporter member 100C.

The guide 140C may include a protrusion 140Ca having a half-circle shape to be protruded on the outer surface 110Cb of the optical supporter 110C. The protrusion 140Ca having the half-circle shape may be provided in plural on the outer surface 110Cb of the optical supporter 110C.

In the inner surface 110Ca of the optical supporter 110C, a groove 140Cb may be formed to have a half-circle shape to correspond to the protrusion 140Ca having the half-circle shape.

Therefore, an external air having a low temperature introduced from the outside of the bottom chassis 30 may be introduced to the cooling flow path 200 inside of the supporter member 100C, and the introduced air may circulate the cooling flow path 200 by making contact with the groove 140Cb having the half-circle shape, formed in the outer surface 110Cb of the optical supporter 110C, thereby decreasing the temperature of the optical supporter 110C.

A temperature of the space (S) between the display panel 10 and the bottom chassis 30 that is increased by the backlight unit 20 may be lowered by the decreased surface temperature of the optical supporter 110C so that a temperature of the internal space (S) of the optical space may be reduced.

Figure 13:
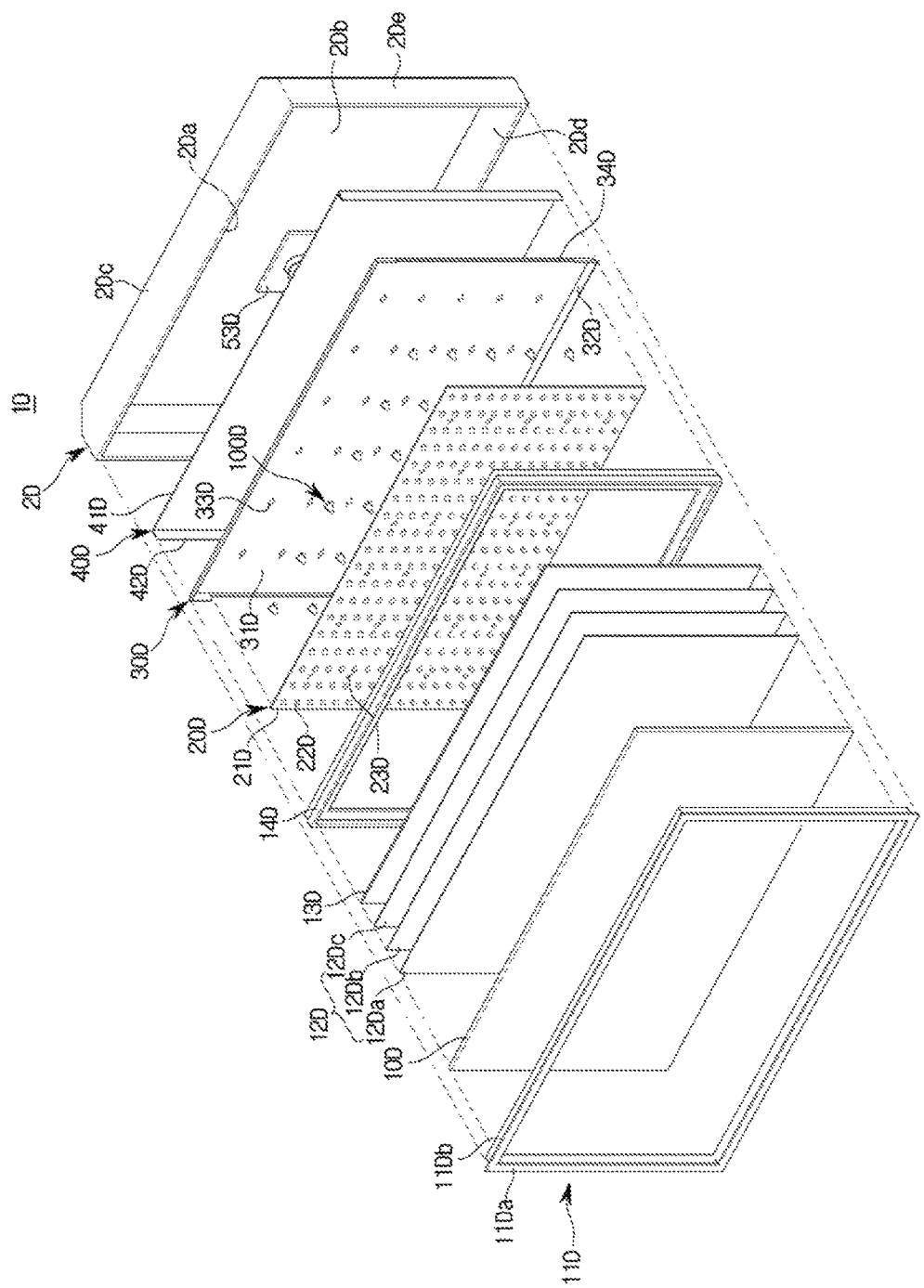
FIG. 13 is a view of a supporter member installed in a display apparatus including a cooling flow path in accordance with another exemplary embodiment of the present disclosure.
Figure 14:
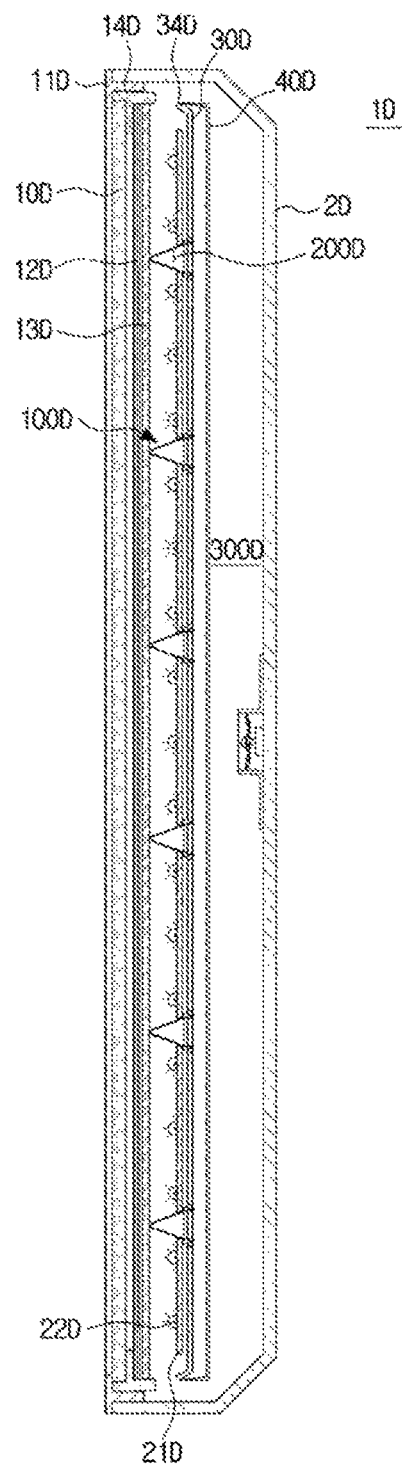
FIG. 14 is a cross-sectional view of a display apparatus including a circulation cooling flow path in which a supporter member is installed in accordance with another exemplary embodiment of the present disclosure.
Figure 15:
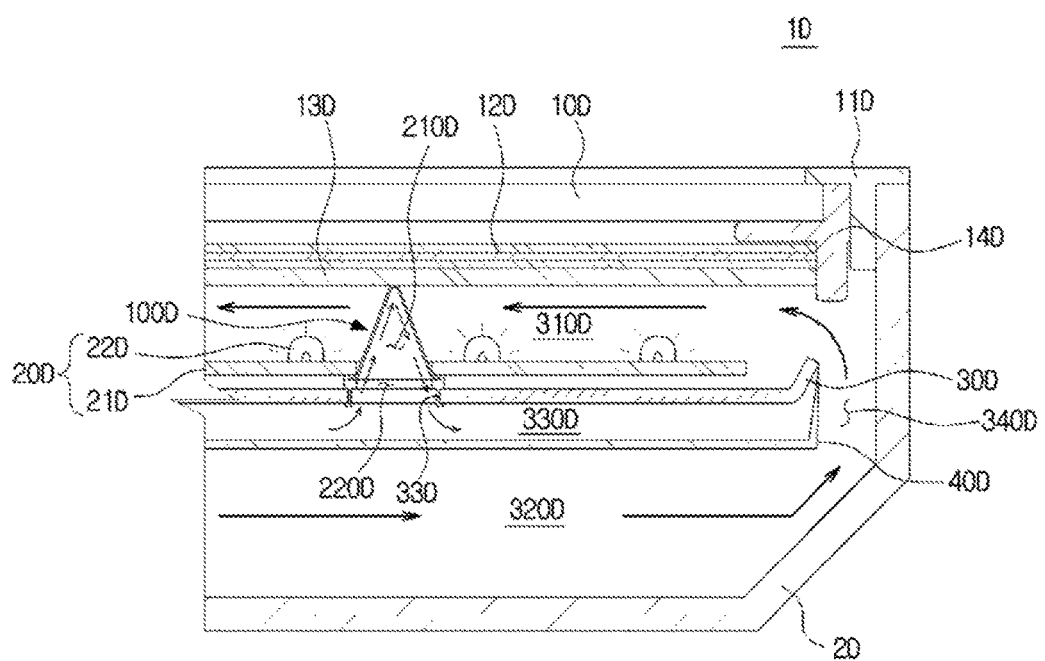
FIG. 15 is a partial enlarged view of FIG. 14.

FIG. 13 is a view of a supporter member installed in a display apparatus including a cooling flow path in accordance with another exemplary embodiment of the present disclosure, FIG. 14 is a cross-sectional view of a display apparatus including a circulation cooling flow path in which a supporter member is installed in accordance with another exemplary embodiment of the present disclosure and FIG. 15 is a partial enlarged view of FIG. 14. Hereinafter drawing symbols that are not shown may refer to FIGS. 1 to 6. In addition, a description of the same parts as those shown in FIGS. 1 to 6 will be omitted.

As illustrated in FIGS. 13 to 15, a display apparatus 1D includes a display panel 10D displaying image information, and a case 2D disposed on an outside of the display panel 10D to protect the display panel 10D and internal electrical components.

The case 2D is formed to surround an edge and a rear surface of the display panel 10D. The case 2D may be formed in a hexahedral shape having an opening 2 Da in a front surface thereof, and may include a rear surface 2Db formed to be spaced apart from the opening 2 Da, an upper surface 2Dc connected to an upper end portion of the rear surface 2Db, a lower surface 2Dd connected to a lower end portion of the rear surface 2Db, and a side surface 2De connected to a right and left side end portion of the rear surface 2Db, respectively.

A top chassis 11D, which is disposed on a front side of the display panel 10D to form an edge of the display apparatus 1D, may be provided in a front side of the case 2D.

The top chassis 11D may be formed in a square ring shape, and may include a bezel unit 11 Da supporting a front edge of the display panel 10D, and a top chassis side unit 11 Db being extended from an outer end of the bezel unit 11 Da to a rear side to be installed in a mid-mold 14D that is described later.

The mid mold 14D is configured to support the display panel 10D.

A backlight unit 20D installed in a rear side of the display panel 10D, a diffusion member 13D configured to diffuse a light emitted from the backlight unit 20D, and a plurality of optical sheets 12D configured to improve optical characteristics of a light passed through the diffusion member 13D may be provided.

The backlight unit 20D may include a printed circuit board (PCB) 21D formed in a flat plate shape, and a plurality of LEDs 22D mounted to the PCB 21D.

A bottom chassis 30D may include a supporting unit 31D formed in a flat plate shape to accommodate the backlight unit 20D, an installation unit 32D provided to form four side edges of the supporting unit 31D and to be installed in the mid mold 14D, and an installation hole 33D provided to install a supporter member 100D.

In the installation unit 32D of the bottom chassis 30D, an air distribution unit 34D configured to form a circulation cooling flow path 300D that is described later, may be formed. The air distribution unit 34D may be formed in a way that a certain part of opposite end portions of the bottom chassis 30D is cut off.

The air distribution unit 34D may be formed in a way that the left and right end portion of the bottom chassis 30D are cut off, and the air distribution unit 34D of the right side of the bottom chassis 30D and the air distribution unit 34D of the left side of the bottom chassis 30D may have a size and a shape corresponding to each other. Via the air distribution unit 34D, an internal air of the display apparatus 1D may easily flow forward and backward across the bottom chassis 30D.

Meanwhile, in the rear side of the bottom chassis 30D, a partition 40D may be disposed to be spaced apart from the bottom chassis 30D with a certain distance. The partition 40D may include a first partition 41D corresponding to the supporting unit 31D of the bottom chassis 30D and a second partition 42D formed in opposite end portions of the first partition 41D.

The backlight unit 20D placed in the bottom chassis 30D may generate heat having a high temperature by the light emitted from the backlight unit 20D. Due to the generation of heat of the backlight unit 20D, it may be necessary to cool the inside of the display apparatus 1D.

Therefore, a circulation cooling flow path 300D is formed between the bottom chassis 30D and the case 2D so that an air is circulated around the bottom chassis 30D to cool the bottom chassis 30D.

The circulation cooling flow path 300D may include a first circulation cooling flow path 310D provided in the front side of the bottom chassis 30D, a second circulation cooling flow path 320D provided in the rear side of the bottom chassis 30D, and a circulation connection flow path 340D configured to connect the first circulation cooling flow path 310D to the second circulation cooling flow path 320D.

The first circulation cooling flow path 310D may be provided in the front side of the bottom chassis 30D to cool heat generated from the PCB 21D and the plurality of LEDs 22D of the backlight unit 20D.

The supporter member 100D may be installed in the first circulation cooling flow path 310D to support the rear side of the display panel 10D.

Several supporter members 100D may be provided in the bottom chassis 30D. The supporter member 100D may include an optical supporter and a supporter supporting unit, and further include a cooling flow path 200D formed to be hollow.

A first cooling flow path 210D is formed in the optical supporter, and a second cooling flow path 220D connected to the first cooling flow path 210D is formed in the supporter supporting unit.

An external air flowing via the installation hole 33D of the bottom chassis 30D is introduced into the first cooling flow path 210D of the optical supporter 110D via the second cooling flow path 220D of the supporter supporting unit 120D.

Therefore, an external air that is circulated via the cooling flow path 200D of the supporter member 100D may decrease the surface temperature of the optical supporter 110D formed of a metal material, and thus the decrease of the surface temperature of the optical supporter 110D may allow the temperature of the space (S) between the display panel 10D and the bottom chassis 30D to be decreased.

The second circulation cooling flow path 320D may be formed between the partition 40D in the rear side of the bottom chassis 30D, and the case 2D.

The first circulation cooling flow path 310D and the second circulation cooling flow path 320D may be connected to each other to be communicated with each other. The first circulation cooling flow path 310D and the second circulation cooling flow path 320D may be connected to each other thorough the circulation connection flow path 340D. The circulation connection flow path 340D may be included in the second circulation cooling flow path 320D and may be formed between the second partition 42D and the inner side surface 2De of the case 2D.

The circulation connection flow path 340D configured to connect the first circulation cooling flow path 310D to the second circulation cooling flow path 320D may be formed by the air distribution unit 34D of the bottom chassis 30D.

In addition, the partition 40D installed in the bottom chassis 30D may form a third cooling flow path 330D with the rear surface of the bottom chassis 30D. The third cooling flow path 330D may be formed between the rear surface of the bottom chassis 30D and the front surface of the first partition 41D. The third cooling flow path 330D may have a shape having an upper end portion thereof and a lower end portion open to allow the first circulation cooling flow path 310D and the second circulation cooling flow path 320D to be communicated with each other.

By the aforementioned structure, an air, which is circulated around the bottom chassis 30D inside of the display apparatus 1D, may form a certain closed loop. That is, the air may flow and circulate along the first circulation cooling flow path 310D in the front side of the bottom chassis 30D, the circulation connection flow path 340D, the second circulation cooling flow path 320D in the rear side of the bottom chassis 30D and the first circulation cooling flow path 310D again so as to cool the inside of the display apparatus 1D.

Meanwhile, the optical space (S) may be enlarged by the circulation cooling flow path 300D so that heat conduction of the inside of the display apparatus 1D may be improved and heat radiation space of the inside of the display apparatus 1D may be enlarged, thereby improving the cooling efficiency by the convective effect.

By the supporter member 100D provided in the circulation cooling flow path 300D, the cooling efficiency of the space (S) between the display panel 10D and the bottom chassis 30D may be more improved.

In addition, a blowing device may be installed on an inner surface 2Db of the rear surface of the case 2D. The blowing device may include a blowing fan and a fan motor configured to drive the blowing fan.

Therefore, a flow velocity of an air, which is circulated in the inside of the display apparatus 1D in a close manner by the circulation cooling flow path 300D, may be enhanced by the blowing fan so that the decrease of the temperature may be accelerated.

Figure 16:
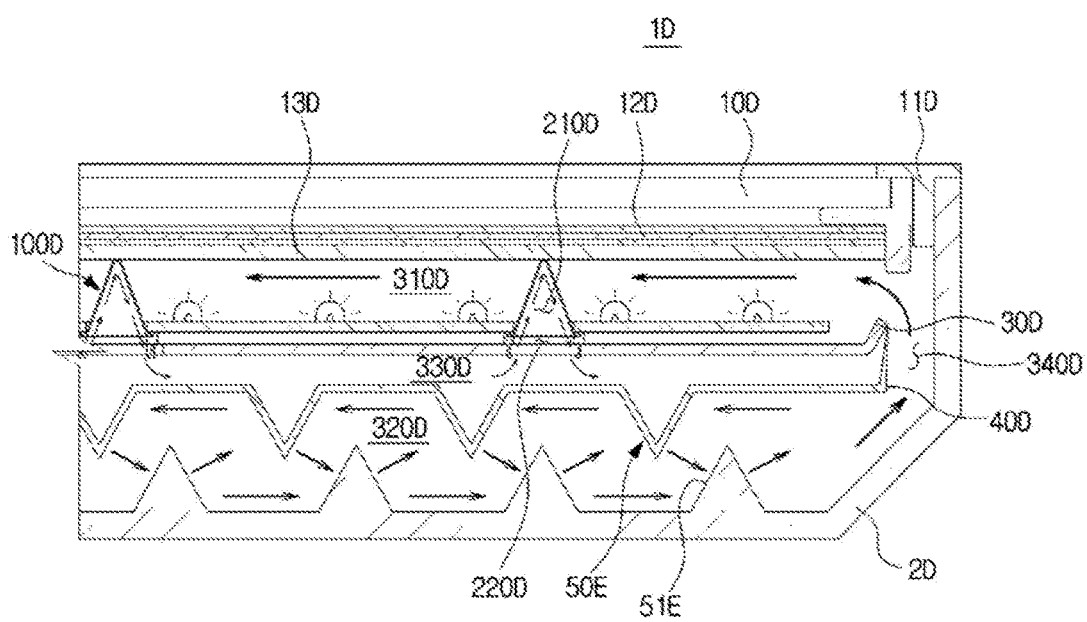
FIGS. 16 and 17 are views of a display apparatus including a circulation cooling flow path in which a guide unit is formed in accordance with another exemplary embodiment of the present disclosure.
Figure 17:
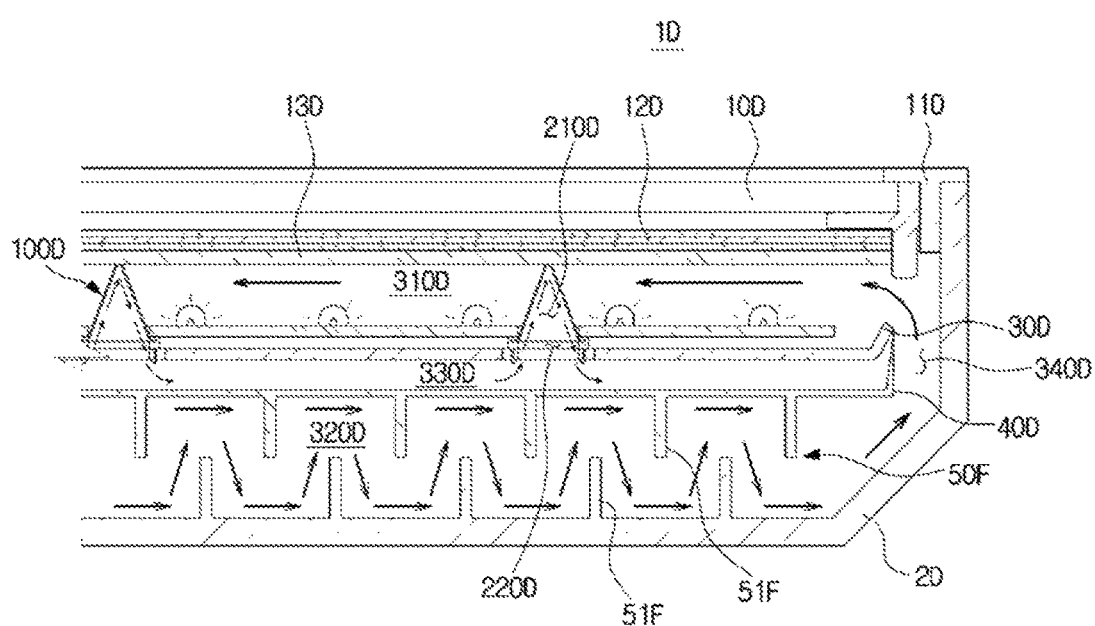

FIGS. 16 and 17 are views of a display apparatus including a circulation cooling flow path in which a guide unit is formed in accordance with another exemplary embodiment of the present disclosure.

As illustrated in FIGS. 16 and 17, the circulation cooling flow path 300D may include a guide unit 50E and 50F configured to guide air current.

The guide unit 50E and 50F may be formed in the second circulation cooling flow path 320D. The guide unit 50E and 50F may be configured to change a direction of the air introduced to the second circulation cooling flow path 320D. The guide unit 50E and 50F may be protruded so that the contact of the air may be improved. The guide unit 50E and 50F may include a protrusion 51E having a triangle-shaped protrusion or a rib 51F having a protrusion shape.

The protrusion 51E having a triangle shape and the rib 51F may be provided in plural, and the protrusion 51E and the rib 51F may be disposed to be spaced apart from each other by a specific distance.

Air introduced into the second circulation cooling flow path 320D of the circulation cooling flow path 300D may be cooled while moving after a direction thereof is changed by making contact with the plurality of guide units 50E and 50F.

As is apparent from the above description, according to the proposed display apparatus, the cooling efficiency of the backlight unit may be improved.

In addition, by effectively reducing a radiant heat and a conductive heat generated by the light source of the backlight unit, the durability of the display apparatus may be improved and the reliability of the product may be enhanced.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

Description of symbols

| | |
|---|---|
| 1: display apparatus | 10: display panel |
| 11: top chassis | 12: case |
| 13: optical sheet | 14: mid-mold |
| 15: diffusion member | 16: hold frame |
| 20: backlight unit | 21: light emitting diode |
| 22: printed circuit board (PCB) | 23: through hole |
| 30: bottom chassis | 33: installation hole |
| 100, 100A, 100B, 100C, 100D: supporter member | |
| 110: optical supporter | 117: supporting plane |
| 120: supporter supporting unit | 121: coupling unit |
| 140: guide | 200: cooling flow path |
| 210: first cooling flow path | 220: second cooling flow path |
| 300: circulation cooling flow path | |

What is claimed is:

1. A display apparatus comprising:
a display panel configured to display an image;
a light source configured to emit a light to the display panel;
a bottom chassis in which the light source is installed; and
a supporter member configured to support the display panel, wherein the supporter member comprises a cooling flow path configured to allow air to flow, wherein the supporter member includes an inner surface, an outer surface, a bottom side and an inside formed by the inner surface and the bottom side, and wherein the inner surface of the supporter member is entirely closed, and the bottom side of the supporter member is opened toward the outside of the bottom chassis so that the air flowing into the inside of the supporter member is prevented from flowing into an inside of the bottom chassis.

2. The display apparatus of claim 1, wherein the supporter member comprises an optical supporter configured to support a rear side of the display panel; and a supporter supporting unit provided in one end portion of the optical supporter, wherein the cooling flow path comprises a first cooling flow path formed in an inside of the optical supporter and a second cooling flow path formed in the supporter supporting unit.

3. The display apparatus of claim 2, wherein the bottom chassis comprises a hole in which the supporter supporting unit is installed.

4. The display apparatus of claim 3, wherein the cooling flow path is connected to an area outside of the bottom chassis via the hole.

5. The display apparatus of claim 1, wherein the supporter member comprises at least one metal material.

6. The display apparatus of claim 2, wherein the optical supporter further comprises a guide.

7. The display apparatus of claim 6, wherein the guide is formed in the inner surface of the optical supporter.

8. The display apparatus of claim 6, wherein the guide is formed in the outer surface of the optical supporter.

9. The display apparatus of claim 6, wherein the guide has a spiral shape.

10. The display apparatus of claim 9, wherein the guide comprises a rib.

11. The display apparatus of claim 10, wherein the rib has a shape having a width that gets smaller in a direction toward the display panel.

12. The display apparatus of claim 2, wherein the optical supporter has a shape having a width that gets smaller in a direction toward the display panel.

13. The display apparatus of claim 1, further comprising:
at least one circulation cooling flow path configured to allow an air to flow to the cooling flow path; and
a blowing fan configured to circulate the air of the circulation cooling flow path.

14. The display apparatus of claim 13, wherein the circulation cooling flow path comprises a guide unit configured to guide an air current.

15. A display apparatus comprising:
a display panel;
a light source configured to emit a light to the display panel;
a bottom chassis configured to support the light source; and
a supporter member provided between the display panel and the bottom chassis,
wherein the supporter member comprises an optical supporter configured to support a rear side of the display panel; a supporter supporting unit configured to connect the optical supporter to the bottom chassis; and a cooling flow path configured to cool a space between the display panel and the bottom chassis, and
wherein one side of the optical supporter is closed, and the other side of the optical supporter is connected to the supporter supporting unit and opened toward the outside of the bottom chassis so that air flowing into an inside of the optical supporter is prevented from flowing into an inside of the bottom chassis.

16. The display apparatus of claim 15, wherein the bottom chassis comprises an installation hole via which the supporter supporting unit is connected, and the supporter supporting unit comprises an air inlet configured to introduce air to the cooling flow path corresponding to the installation hole.

17. The display apparatus of claim 15, wherein the optical supporter comprises at least one metal material.

18. The display apparatus of claim 15, wherein the supporter supporting unit comprises at least one from among a plastic, an acrylic, and a resin material.

19. The display apparatus of claim 15, wherein the optical supporter comprises a guide.

20. The display apparatus of claim 19, wherein the guide is formed in at least one from among an inner surface and an outer surface of the optical supporter.

* * * * *